C. E. JOHNSON

Dec. 15, 1931. INSTRUMENT PANEL FOR AIRCRAFT Re. 18.283

Original Filed July 2, 1929

INVENTOR

BY Carl E. Johnson

James D. Gilmartin

ATTORNEY

Reissued Dec. 15, 1931 Re. 18,283

UNITED STATES PATENT OFFICE

CARL EUGENE JOHNSON, OF OAKLAND, CALIFORNIA, ASSIGNOR TO BOEING AIRPLANE COMPANY, OF SEATTLE, WASHINGTON, A CORPORATION OF WASHINGTON

INSTRUMENT PANEL FOR AIRCRAFT

Original No. 1,754,954, dated April 15, 1930, Serial No. 375,439, filed July 2, 1929. Application for reissue filed October 6, 1931. Serial No. 567,275.

This invention relates to improvements in instrument panels as used in aircraft, and more especially to the arrangement of the instruments on the panel, and the means for adjusting or setting said instruments for certain predetermined conditions of flight, whereby the attainment of all such conditions may be noted at a glance by the pilot by reason of the several indicating members all coming into a predetermined position relationship to the other indicating members—for instance, into parallelism; thereafter any deviation from such conditions can be noted at a glance by reason of departure of one or more instrument pointers from this set relationship. By such an arrangement the object is attained of permitting the pilot to give his sole attention to observation of terrain, maps, radio signals, external conditions and the like, and to enable him to keep watch on his instrument panel without the necessity of precisely reading and consciously noting each instrument from time to time, and checking it with the desired conditions; thus he may know at a glance whether or not the predetermined conditions of flight—for instance, air speed, rate of climb, motor revolutions per minute, and altitude—have been or are being maintained.

Another object of the invention, in conjunction with the adjustment of the instruments upon the panel, and in connection with one special embodiment, is the provision of guide members (such for example as lines of luminous paint or the like) upon the panel, interconnecting the instruments, and, further, the application of luminous paint or the like to the hands and numerals of the instruments, whereby, for a particular setting, the instrument pointers may be made to line up with the lines across the panel, thus affording a ready indication as to whether or not proper conditions of flight are being maintained, during daylight or night flying.

Another object of the invention is the provision of means for mounting the instruments on the panel to permit of quick and easy rotation, but at the same time arresting all except intentional movement of the instruments, this same means providing a cushioned support for the several instruments.

These and other objects will appear as my invention is more fully hereinafter described in the following specification (wherein the principles of my invention are set forth in a preferred embodiment), illustrated in the accompanying drawings in such embodiment, and finally defined in the appended claims.

Figure 1:
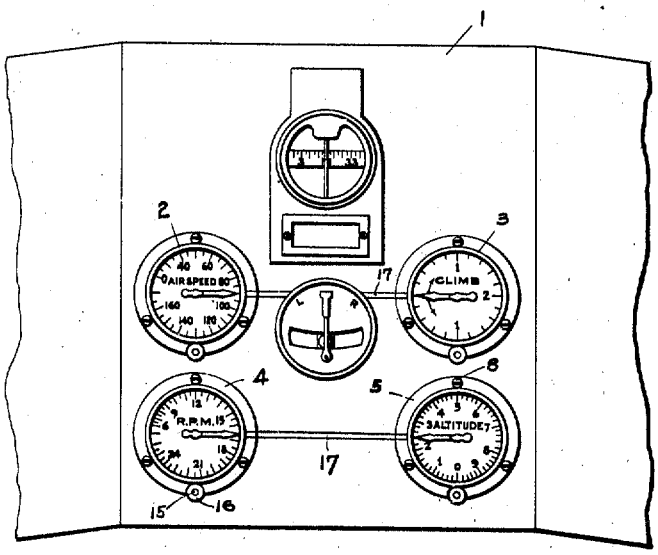
Figure 1 is a face view of the instrument panel as viewed from the operator's cockpit.

The instrument panel 1 is intended to be mounted in front of the pilot of an aircraft, and upon it are mounted various instruments indicating the conditions of flight. For this purpose the panel may be apertured, as indicated at 1*a*, to receive the several flight instruments, which may be, for instance, the air-speed indicator 2, the rate-of-climb indicator 3, the tachometer 4, and the altimeter 5. Various other instruments may be mounted upon the panel as well, such as the compass and the turn-and-bank indicator, and such instruments may be so designed as to be adjustable or not, as may be desired or found necessary according to the nature and use of the instruments.

Of the several instruments concerned, all may be identical with each other as far as their shape and size are concerned, and so far as is concerned the method of rotatably mounting them on the panel, which may be the same in the case of each instrument. A description of one instrument and its mounting will therefore suffice for all.

The casing of the instrument, indicated at 5*a*, is preferably cylindrical in shape, and may be formed with an annular enlargement or flange 6, to which is secured or with which is formed integrally a ring gear 7. The casing of the instrument is presented to the aperture 1a from the rear of the panel and advanced therethrough until the flange 6 abuts the panel. At the same time the front face of the instrument abuts a retaining ring 7a which is secured to the panel by means such as bolts 8 and nuts 9.

Figure 4:
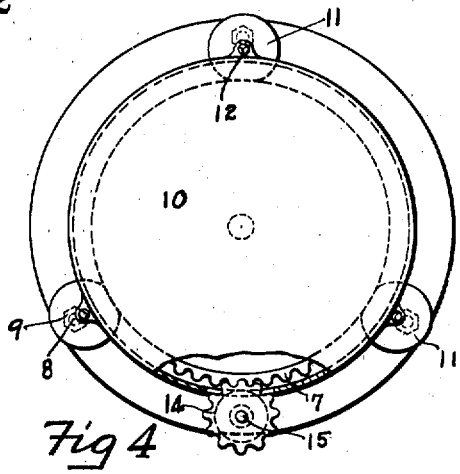
Figure 4 is a rear view of the construction of Figure 3.

A hollow cylindrical housing 10 is provided for the instrument, and this is also secured to the panel by suitable means, such as the bolts 8 and 9 heretofore referred to. Spaced around the periphery of the housing 10 are a plurality of rollers 11. Preferably these are formed of resilient material, such as rubber or the like, and they are rotatably mounted, for instance, upon the pins 12 received in upturned ears 13 of the housing 10. It will be noted in Figure 4 that the circumference of the instrument casing 5a is greater than a circumference drawn tangentially to all of the rollers in a relaxed position—that is, with the instrument removed. Now by inserting the instrument, the rollers become distorted and cause frictional engagement between the rollers and the instrument casing. This frictional engagement permits turning of the instruments by the application of some slight force, but prevents their unintentional turning, such as might occur from the vibrations generally present in aircraft.

A pinion 14 is meshed with the ring gear 7, and means such as the knob 16 upon the shaft 15, which carries the pinion, permits the pinion, and consequently the instrument and its casing, to be rotated merely by turning the knob.

Figure 2:
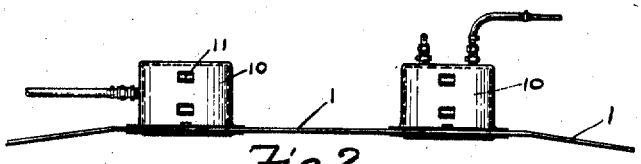
Figure 2 is an edgewise plan view of Figure 1.
Figure 3:
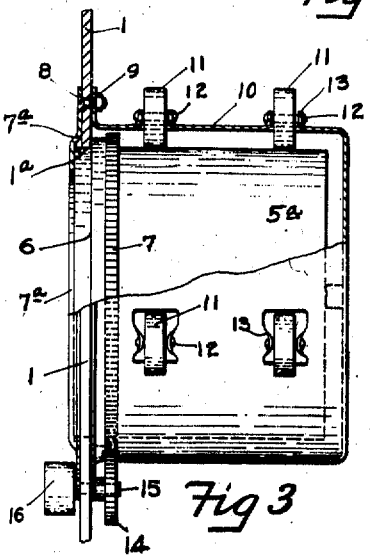
Figure 3 is an enlarged sectional view of an individual instrument casing, partly in section, showing particularly the means for rotatably mounting and cushioning the instruments.

In such cases where the instruments are provided with metallic tubular connections, as shown in Figure 2, portions of rubber hose are interposed between the instrument and the end of the tube to permit of turning of the instrument without disturbing the metallic tube.

In the ordinary use of this invention, the pilot, before making a flight, would set the instruments so that when the predetermined conditions of flight are attained, the pointers of the several instruments will bear to each other a predetermined position relationship. It is largely immaterial what this relationship may be, but it should be such that the pilot may, at a glance, ascertain if any one or more of the pointers is out of the proper position, or, conversely, if all of the pointers are properly positioned. This position relationship may be all parallel, whether extending horizontally or all extending at some given angle to a line extending transversely of the panel, or all may extend vertically.

As a matter of convenience, then, the instruments may be so adjusted that when the predetermined conditions of flight have been attained, they will all be horizontal and all will point inwardly toward the opposite instruments. This enables the employment of a straight line of phosphorous paint, or any other suitable luminous material, indicated at 17, drawn on the face of the panel, extending transversely thereof from instrument to instrument, with which the pointers of such instruments may come into alignment. The numerals on the face of each instrument and also the pointers may likewise be treated with the luminous material, of course for convenience in night flying.

Now, before the pilot takes off, he may determine, or know from experience, that it is necessary for him, in order to clear a distant barrier, or to reach a desired point, to climb at a given rate, to reach eventually a given altitude, and to travel at a given air speed, which in turn requires that the motor revolve at a given number of revolutions per minute. For example, as shown in Figure 1, the predetermined air speed will be ninety miles per hour. The engine R. P. M. will be 1650, as shown by the tachometer. The altimeter may be set so that its pointer will come horizontal when the plane has reached 2200 feet. The rate-of-climb indicator may be set to bring about a climb at an angle of 10°. Now when he takes off he knows if his tachometer pointer is in line with the line 17, or otherwise is in the proper and predetermined position, and if his air-speed indicator is likewise in that predetermined position, that the controls affecting these elements require no attention. Likewise, if his rate-of-climb indicator is in line with the line 17, or is otherwise positioned in the predetermined relation to the other pointers, he knows that the controls affecting this condition of flight require no attention. His altimeter will not yet have attained the desired position, and this pointer will not correspond to the others, but eventually he will attain the desired altitude, and he can ascertain at a glance that he has attained such altitude by observing when the pointer of the altimeter attains the position corresponding to the positions of the other pointers. When this condition has been attained, he does not need to climb higher, and he can at once rotate his rate-of-climb indicator to adjust it to a neutral or zero position, where again its pointer will take the position corresponding to the positions of the other pointers, and any deviation from this position will be apparent at a glance, since all pointers should now occupy the same position (suitable adjustment having been made in the other instruments to correspond now to level flight).

If, during flight, the airplane started to climb more than the pilot desired, the rate-of-climb indicator would at once show this, the air speed would be reduced and the air-speed indicator would show at a glance that this was the case, and the tachometer would show a decrease of engine revolutions per minute. Possibily also the altimeter would show an increase in altitude, and this would all be indicated by reason of the fact that the several pointers would assume different attitudes, and would not lie in a symmetrical attitude, one with relation to the others.

What I claim as my invention is:

1. In combination with an instrument panel for aircraft, a plurality of flight-indicating instruments, each including a face-plate and a pivotally mounted pointer capable of assuming different angular positions with respect to its face-plate, according to varying conditions of flight, and means supporting each instrument from the panel for angular adjustment thereon, to bring each pointer, upon the aircraft attaining predetermined conditions of flight affecting the several instruments, into like angular relationship to a line extending transversely of the panel, whereby the pilot may at a glance ascertain that all the predetermined conditions have been or are being maintained.

2. In combination with an instrument panel for aircraft, a plurality of flight-indicating instruments, and means for adjustably mounting said instruments on said panel to bring the several indicating elements thereof, when indicating conditions to be maintained static, into predetermined position relationship with all other indicating elements.

3. In combination with a mounting for aircraft instruments, a plurality of instruments each including a pivotally mounted pointer, and means supporting said instruments upon said mounting for adjustment to bring their pointers, at selected readings, into a predetermined angular relationship to the other pointers at such selected readings.

4. In combination with an instrument panel for aircraft, a plurality of flight-indicating instruments each including a cylindrical casing, a face-plate, and a pivotally mounted pointer movable over the face-plate to assume different angular positions according to varying conditions of flight, and means supporting each casing from the panel for rotation about its axis, to bring each pointer, upon the aircraft attaining predetermined conditions of flight affecting the several instruments, into parallelism, whereby the pilot may at a glance ascertain which, if any, of the conditions of flight are other than as predetermined.

5. An instrument panel for aircraft comprising a plurality of flight-indicating instruments adjustably mounted with respect to said panel and guide lines on said panel interconnecting said instruments.

6. An instrument panel for aircraft comprising a plurality of flight-indicating instruments mounted on said panel, indicating marks on said panel and means for adjusting said instruments with respect to said indicating marks.

7. An instrument panel for aircraft comprising a plurality of flight-indicating instruments mounted on said panel, indicating marks on said panel and means for adjusting said instruments with respect to said indicating marks, said means comprising a housing for rotatably supporting said instruments and means external of the panel for rotative engagement with the instruments.

8. An instrument panel for aircraft comprising a plurality of flight indicating instruments rotatably mounted to said panel within housings which are fixed to the panel, rotatable resilient means between the housing and said instrument.

Signed at Oakland, Alameda County, California, this 25th day of September, 1931.

CARL EUGENE JOHNSON.